(12) United States Patent
Deighton et al.

(10) Patent No.: US 8,201,979 B2
(45) Date of Patent: Jun. 19, 2012

(54) COLLAPSIBLE LIGHT (75) Inventors: Kevin Deighton, Long Beach, CA (US);
Darren Judd, Stamford (GB)

(73) Assignee: Pelican Products, Inc., Torrance, CA (US)

( * ) Notice: Subject to any disclaimer, the term of this patent is extended or adjusted under 35 U.S.C. 154(b) by 319 days.

(21) Appl. No.: 12/591,487

(22) Filed: Nov. 20, 2009

(65) Prior Publication Data

US 2011/0122605 A1 May 26, 2011

(51) Int. Cl.
*F21S 8/08* (2006.01)
(52) U.S. Cl. ............. 362/413; 362/190; 248/177.1; 248/178.1
(58) Field of Classification Search .......... 362/413, 362/424, 197–199, 190; 248/177.1, 178.1
See application file for complete search history.

(56) References Cited

U.S. PATENT DOCUMENTS

| | | | |
|---|---|---|---|
| 3,026,409 A | 3/1962 | Deisch | |
| 3,697,031 A | 10/1972 | Glickman et al. | |
| 3,944,806 A | 3/1976 | Jones et al. | |
| 5,122,781 A | 6/1992 | Saubolle | |
| 5,319,365 A | 6/1994 | Hillinger | |
| 5,424,928 A * | 6/1995 | Jordan et al. | 362/162 |
| 5,630,660 A | 5/1997 | Chen | |
| 5,934,628 A | 8/1999 | Bosnakovic | |
| 6,265,969 B1 | 7/2001 | Shih | |
| 6,454,228 B1 | 9/2002 | Bosnakovic | |
| 6,625,918 B2 | 9/2003 | Bhullar | |
| 6,637,904 B2 | 10/2003 | Hernandez | |
| 6,873,249 B2 | 3/2005 | Chu | |
| 6,899,441 B2 | 5/2005 | Chen | |
| 7,063,444 B2 | 6/2006 | Lee et al. | |
| 7,083,298 B2 | 8/2006 | Pritchard et al. | |
| 7,121,688 B2 | 10/2006 | Rempel | |

(Continued)

FOREIGN PATENT DOCUMENTS

BE 458 242 3/1945

(Continued)

OTHER PUBLICATIONS

European Search Report cited in related EP Search Report for Application No. 07119450, completed Apr. 3, 2008.

(Continued)

*Primary Examiner* — Robert May
(74) *Attorney, Agent, or Firm* — Foley & Lardner LLP (57) ABSTRACT

A collapsible lighting device has a main body surrounded by a collar whose position is adjustable along the longitudinal axis of the main body. Pivotally connected or hinged legs are attached to the collar and to the main body with struts. When the collar is on one position, the legs deploy outward from the main body to the extent permitted by the struts, thereby allowing the legs to support the collapsible lighting device upright. A lamp head is attached to a member which telescope from the main body. When deployed, the lamp head can be switched on to provide illumination. When the collar is another position, the legs are drawn in toward the main body to form a cylindrical shape. The lam head can be positioned so that when the telescoping member is retracted into the main body, the collar surrounds the exterior of the lamp head, thus protecting the lamp head for transport. The overall cylindrical shape of the lighting device in the collapsed position facilitates transport, for example using a strap to carry the device on one's back.

19 Claims, 12 Drawing Sheets

U.S. PATENT DOCUMENTS

| | | |
|---|---|---|
| 7,296,909 B2 | 11/2007 | Van Deursen et al. |
| 7,339,341 B2 | 3/2008 | Oleynikov et al. |
| 7,342,360 B2 | 3/2008 | Van Deursen et al. |
| 7,364,320 B2 | 4/2008 | Van Deursen et al. |
| 7,394,398 B2 | 7/2008 | Pederson |
| 2003/0103357 A1 | 6/2003 | Drake et al. |
| 2003/0161135 A1 | 8/2003 | Hernandez |
| 2004/0042211 A1 | 3/2004 | Jigamian et al. |
| 2005/0015142 A1 | 1/2005 | Austin et al. |
| 2005/0117340 A1 | 6/2005 | Lee et al. |
| 2006/0012487 A1 | 1/2006 | Gibson et al. |
| 2006/0209547 A1 | 9/2006 | Biondo et al. |
| 2007/0019398 A1 | 1/2007 | Chen et al. |
| 2007/0158509 A1 | 7/2007 | Hubbell |

FOREIGN PATENT DOCUMENTS

| | | |
|---|---|---|
| DE | 295 20 042 U1 | 2/1996 |
| DE | 202 00 634 U1 | 5/2002 |
| WO | WO 02/44503 A1 | 6/2002 |
| WO | WO 2009/108455 A2 | 9/2009 |

OTHER PUBLICATIONS

Brand Name: Lumapro http://www.grainger.com/Grainger/items/2YKH8.
Brand Name: Fostoria http://www.grainger.com/Grainger/items/3HMK5.
Brand Name: Husky http://www.toolsnob.com/archives/2007/10/husky_84watt_protable_tripod_f_1.php.
Brand Name: Bayco http://www.baycoproducts.com/consumer.html.
Brand Name: Coleman Cable http://www1.mscdirect.com/CGI/NNSRIT?PMPXNO=2055822&PMT4NO=63027152.
Brand Name: Stanley http://www1.mscdirect.com/CGI/NNSRIT?PMPXNO=17595932&PMT4NO=63027152http://electrical.hardwarestore.com/12-35-work-lights/rite-lite-heavy-duty-convertible-worklight-105726.aspx.
Brand Name: Air Light Systems http://www.airsystems.com/product_pages/environmental_control/area_Lightingsystems.htm.
Brand Name: Ritelite http://www.homedepot.com/Lighting-Fans-Work-Lights/RiteLite/h_d1/N-5yc1vZ1xr5Z3ynZaqn9/h_d2/Navigation?langId=-1&storeId=10051&catalogId=10053&omni=c_WorkLights.
Brand Name: Cooper Lighting http://www.hardwareandtools.com/invt/4105383.
Brand Name: UtiliTech http://www.lowes.com/pd_156853-52757-WL500RSP-_0_?productId=1215353&Ntt=worklight&Ntk=i_products&pl=1&currentURL=/pl_0_s?newSearch=true$Ntt=worklight$y=5$x=12.
Brand Name: Northern Industrial http://www2.northerntool.com/lighting/standing-work-lights/item-160953.htm.
Brand Name: Craftsman http://www.sears.com/shc/s/p_10153_12605_03473826000P?sid=BVReview.
Brand Name: Extenda-Lite http://www.edarley.com/finditem/19565.
Brand Name: Brytte Day http://www.fireresearch.com/product.php?id=opa740.
Brand Name: RayMax http://www.khindustries.com/webmodules/catcatalog/dtl_AllProductList.aspx?SubID=41.
Brand Name: EML Technologies http://www.ronshomeandhardware.com/ProductDetails.asp-?ProductCode=697054&Click=1014.
Brand Name: Power Zone http://www.hardwareandtools.com/invt/5382759.
Brand Name: Master Tradesman http://www.hardwareandtools.com/invt/u697027.
Brand Name: Designers Edge http://www.designersedge.com/UI/ProductDetails.aspx?mcid=1&pcid=1&ccid=11&pid=12.
Brand Name: RAB Lighting http://www.rabweb.com/product_line_detail.php?prodline=TOWER.
Brand Name: Warner http://.www.thehardwarecity.com/?sku=6315865.
http://www.amazon.com/Stanley-95-112-Tripod-LED-Flashlight/dp/B000CC2KP4.
European Search Report cited in related EP Patent Application No. 10 07 5729, completed Feb. 16, 2011.
Brand Name: Ritelite http://www.homedepot.com/webapp/wcs/stores/servlet/ProductDisplay?storeId=10051&langId=-1&catalogId=10053&productId=100659826.
Brand Name: UtiliTech http://www.lowes.com/lowes/lkn?action=productDetail&productId=246911-52757-WL500TPT-L&lpage=none.
Brand Name: Northern Industrial http://www2.northerntool.com/lighting/standing-work-liqhts/item-160953.htm.
Brand Name: Designers Edge http://82.165.178.48/de/products.php?scid=80.
Brand Name: Clarke http://qualitytoolsforless.com/Product.aspx?ProductID=2893.

* cited by examiner

COLLAPSIBLE LIGHT

BACKGROUND OF THE INVENTION

1. Field of the Invention

The Invention relates to collapsible structures, in particular a collapsible lighting device which can be transported to provide lighting in areas where flashlights are unsatisfactory.

2. Background of the Invention

Flashlights have been used extensively in areas where lighting is not available. In many circumstances, however, flashlights are inadequate because they fail to provide adequate lighting to accommodate the needs of workers, campers, or persons engaged in other activities. Portable lights which stand alone provide necessary levels of light while leaving workers and other individuals free hands to perform tasks and conduct other activities. Portable lights, however, tend to be bulky and large and inconvenient to carry. The invention disclosed herein provides a collapsible light in a form factor which is portable and easy to carry to provide light for many applications.

DETAILED DESCRIPTION OF THE PREFERRED EMBODIMENTS

Figure 1:
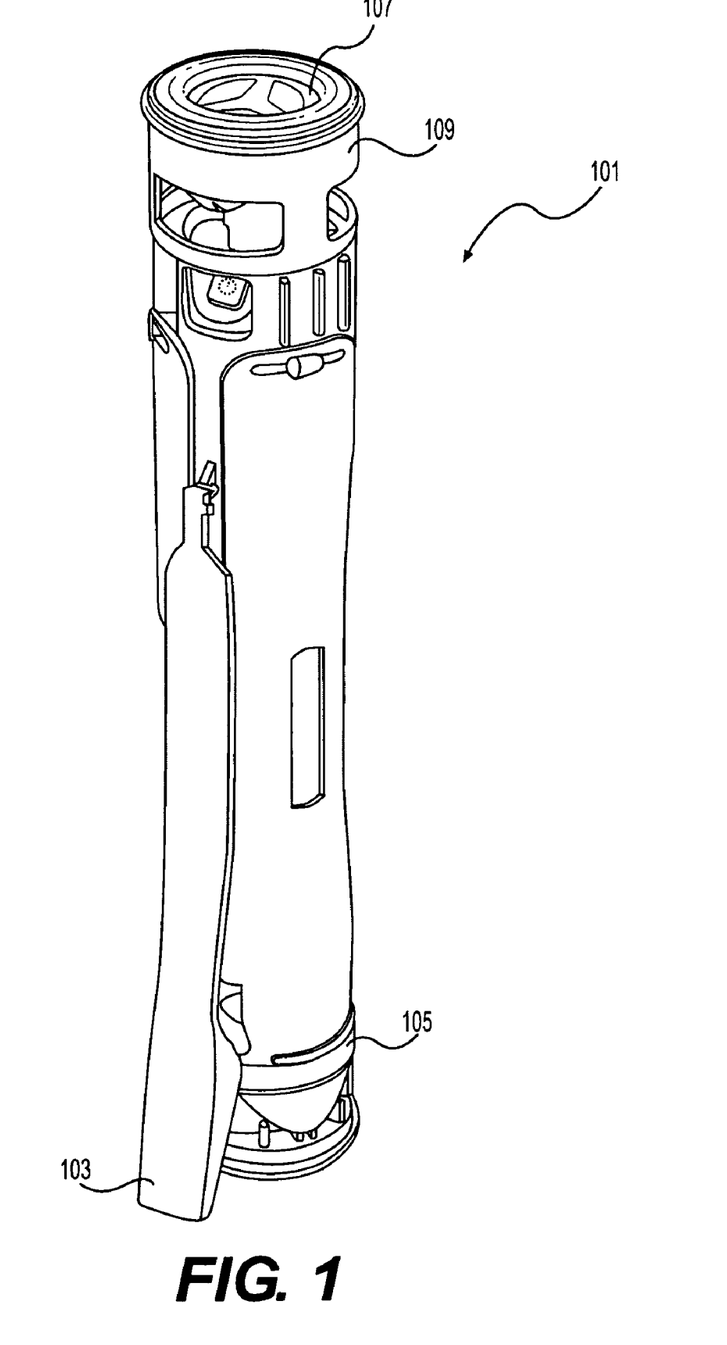
FIG. 1 shows a collapsible light according to the invention in a collapsed position for transport.
Figure 2:
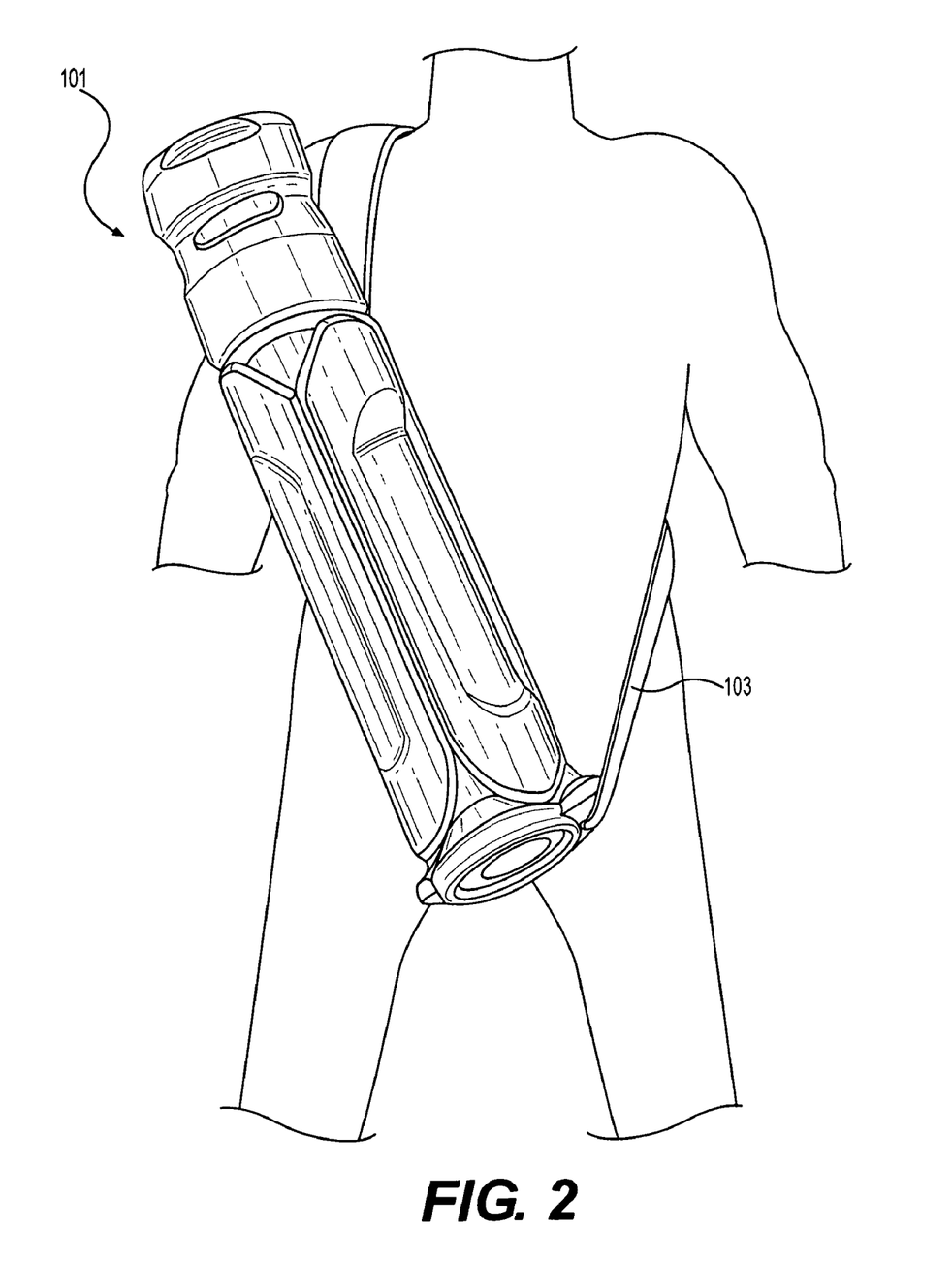
FIG. 2 illustrates a collapsible light in a collapsed position as it might be carried on a back of a person.

FIG. 1 shows a collapsible light 101 according to the invention in a substantially cylindrical form factor, resembling a bazooka, for easy transport. Collapsible light 101 has attached to it a carrying strap, 103, to facilitate carrying the bazooka shaped collapsible light on one's back, as illustrated in FIG. 2. FIG. 1 further shows securing strap 105. Securing strap 105 can be used as one way to secure the legs, as discussed further herein, to form an exterior portion of the cylindrical shape in the collapsed position. Other means for securing the legs in the collapsed position can also be used. FIG. 1 further illustrates lamp head 107, which has sockets therein for illuminating elements. As shown in FIG. 1, lamp head 107 is tucked into a collar 109 to protect the lamp head when the light is in the collapsed position.

Figure 3:
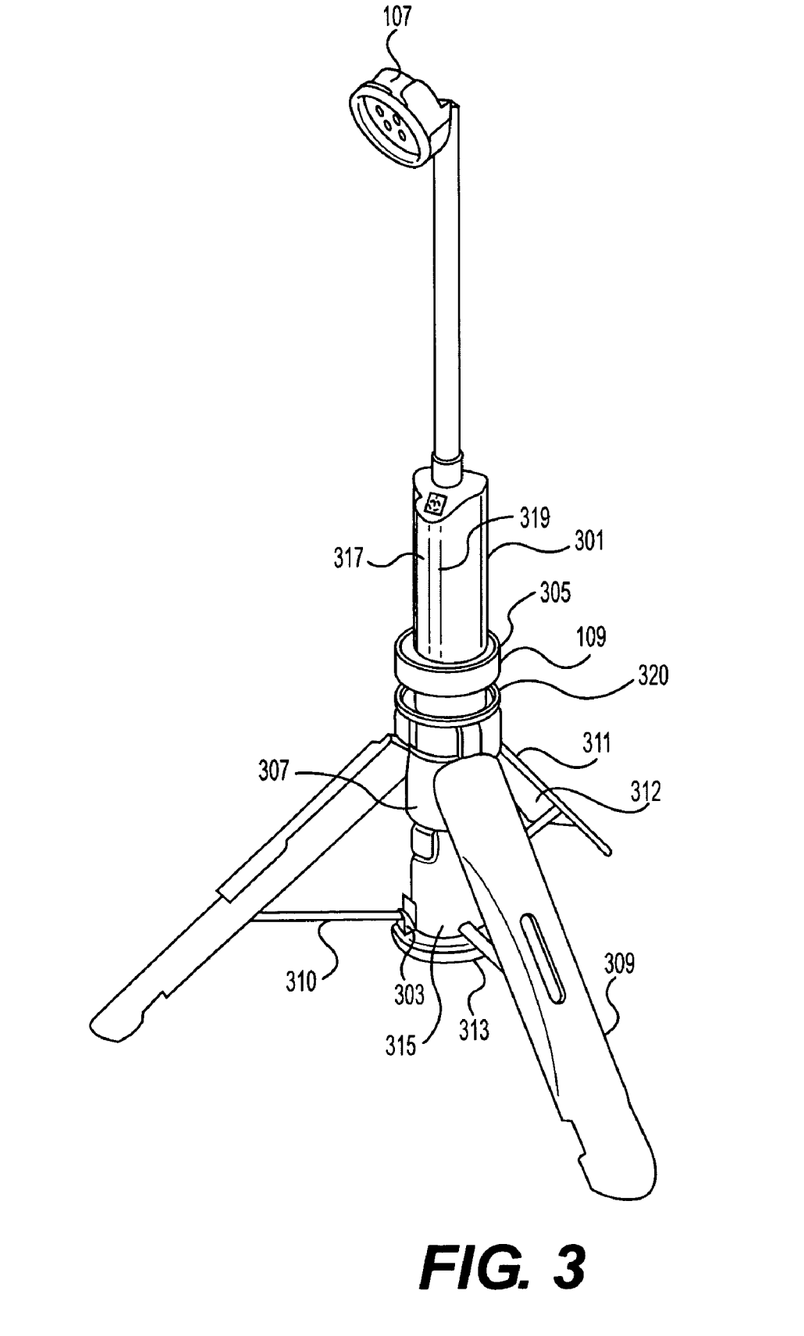
FIG. 3 shows a collapsible light according to the invention in a fully deployed position.

FIG. 3 illustrates an embodiment of a collapsible light according to the invention in the deployed position. As shown in FIG. 3, the structure of a collapsible light according to the invention includes a main body 301 which mounts on top of a lower body serving as a battery compartment 303 to form a substantially cylindrical shape. The main body and battery compartment can be formed separately or as an integrated unit. Other shapes, such as triangular, square, oval and rectangular, may also be employed without departing from the scope of the invention.

The invention also is not limited to any particular battery type. For example, the battery can be rechargeable or non-rechargeable. Battery charging circuitry and a suitable plug to an external power source may be incorporated into the lower body battery compartment 303, or elsewhere in the light, as may be convenient. It is within the scope of the invention to provide illumination using an AC power source and/or one or more transformers.

The interior of main body 301 can house electrical cables, such as a coiled electrical cable (not shown), to deliver electrical power to one or more illuminating elements, such as light emitting diodes, in the lamp head 107. Other types of illuminating elements, such as incandescent, halogen or fluorescent light elements, may be used in lamp head 107, without departing from the scope and spirit of the invention. As discussed further herein, the main body 301 also accommodates one or more telescoping members, which allow the lamp head 107 of the collapsible light according to the invention to be set at different heights to provide light over different size areas.

The main body 301 is surrounded by collar 109. In the exemplary configuration shown in FIG. 3, collar 109 is a two part hollow cylindrical member, including upper collar portion 305 and lower collar portion 307. The upper and lower collar portions, 305 and 307, may be formed separately and connected together or may be formed as an integrated unit. Upper collar portion 305 has a wider outer diameter than lower collar portion 307.

One or more legs 309 are pivotally attached or hinged to lower collar portion 307 at pivot points 311. The legs preferably have a curved shape, such that when the portable light according to the invention is in the collapsed position, the legs form a cylindrical exterior surface which approximates the exterior surface of the upper collar portion 305.

Optional metal prongs 312 on the interior surface of legs 309 exert a spring force biasing legs 309 outward from the lower collar portion 307 into the deployed position. Struts 310 control the outward extension of legs 309. Struts 310 are pivotally connected to the lower portion of the central section of the collapsible light, for example to battery compartment 303, and pivotally connected to the interior portion of legs 309. Struts 310 act to control the legs as they deploy away from the outer surface of the lower collar portion 307, limit the distance the legs 309 deploy and provide stability when the legs 309 are fully deployed. Those of ordinary skill will recognize that struts 310 could be connected at different locations on the interior surface of the legs and on the central section of the collapsible light to achieve different relationships between the legs 309 and the central section of the collapsible light as desired. For example, the struts 310 could be positioned and sized such that the base 313 touches the ground or other surface beneath the base when the collapsible light is deployed. Alternatively, struts 310 could be positioned and sized to insure that the base 313 does not touch the ground or other surface beneath the base when the collapsible light according to the invention is deployed.

Figure 4:
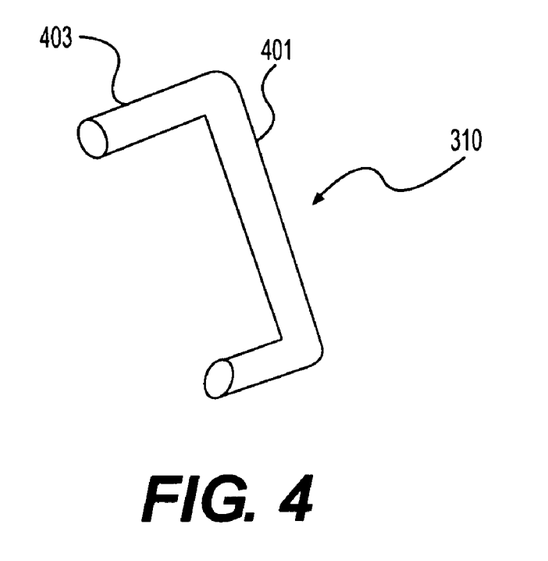
FIG. 4 shows a strut in an assembly for use in a collapsible light according to the invention.

FIG. 4 illustrates one possible configuration of strut 310. The strut has a central member 401 extending between a first strut leg 403 which pivotally engages a leg 309 and a second strut leg which pivotally engages the battery compartment 303. Other strut configuration may be used without departing from the scope of the invention.

When the legs 309 are collapsed, the exterior surface of each leg is substantially aligned with the exterior surface of lower collar portion 307, thereby forming a substantially cylindrical shape covering the main body 301 and battery compartment 303. Base 313 encloses battery compartment 303 forming a battery compartment lid at its bottom portion. As shown in FIG. 3, base 303 has an outer diameter which approximates the outer diameter of the upper collar portion 305. In one exemplary configuration, a lip 315 formed by the exterior of the battery compartment 303 and base 313 can be entirely recessed or recessed in one or more locations so that when legs 309 are collapsed, they can be held in place by the recesses. As noted above, however, an alternative is to hold legs 309 closed with a strap 105.

In operation, collar 109 and main body 301 move relative to each other, so that the light can be deployed or placed in the collapsed position. Collar 109 has hand grips 320, which are openings in the upper collar portion 305. These opening serve as hand grips for use in collapsing the light. When the collapsible light is deployed and the collar 109 is lifted using hand grips 320, legs 309 lift from the surface on which they sit and move toward the battery compartment. This movement of the legs 309 toward the battery compartment drives the collar 109 upward relative to the main body 301. When the portable light is deployed from the closed position, collar 109 moves downward relative to the main body, as the legs 309 move away from the battery compartment 303.

In order to facilitate and control the movement between the main body 301 and the collar 109, main body 301 has slots 317 on its exterior surface 319. Slots 317 can be formed either as indentations in the exterior surface of the main body 301 or parallel protrusions from the exterior surface 319.

Figure 5:
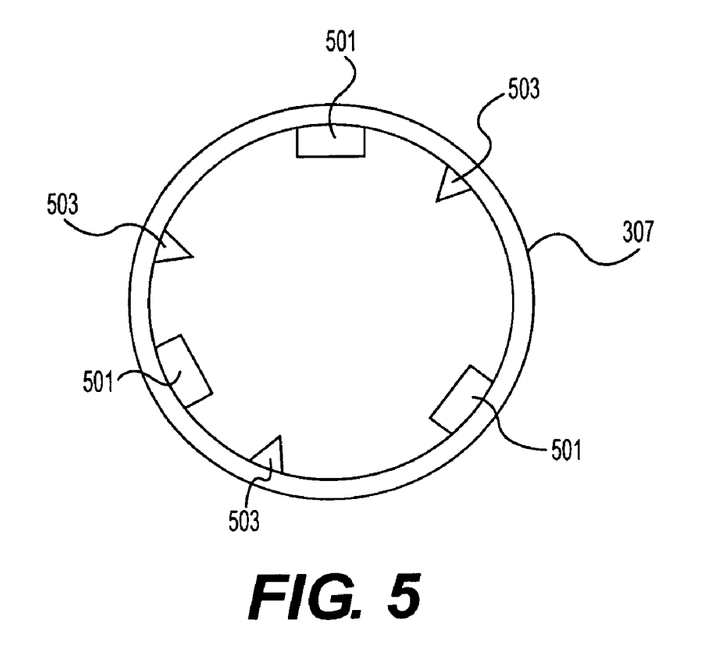
FIG. 5 shows a portion of a collar assembly in a collapsible light according to the invention.

As shown in FIG. 5, at least one part of collar 109, such as lower collar portion 307, has on its interior one or more guides 501. Guides 501 engage slots 317 in main body 301 and slide therein. FIG. 5 also shows lower collar portion 307 having one or more other interior members 503 on its inner surface. Interior members 503 provide added strength to the collar portion. In addition, because interior members 503 extend inward toward the main body 301, interior members 503 help to control lateral movement or wobbling between the main body 301 and the collar 109.

Figure 6:
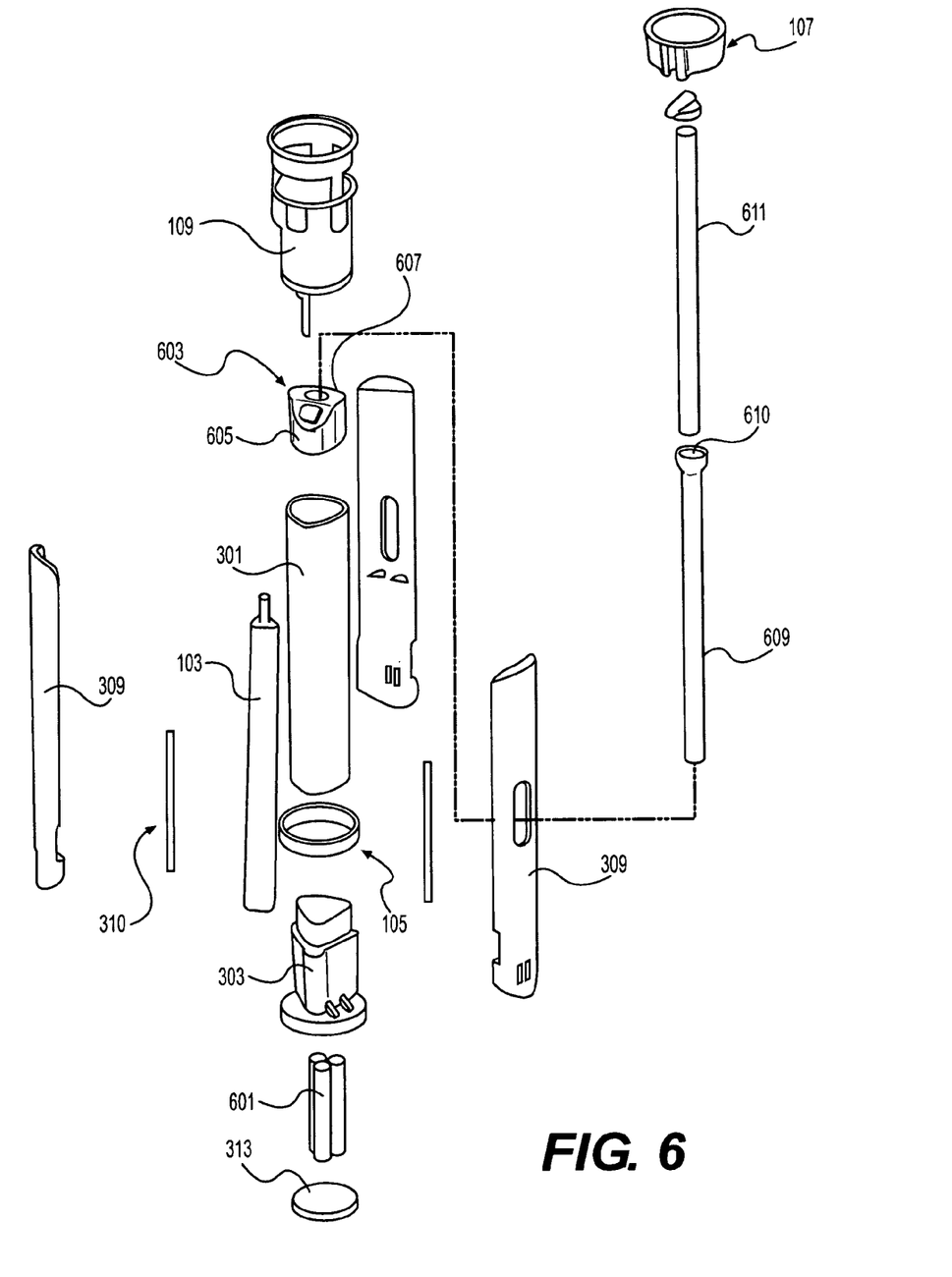
FIG. 6 shows an exploded view of the elements of the light according to the invention.

FIG. 6 is an exploded view of the elements of the exemplary embodiment of a collapsible light according to the invention as discussed herein. FIG. 6 illustrates how the various elements previously discussed fit together. In addition, FIG. 6 illustrates a battery pack 601 for insertion into battery compartment 303. FIG. 6 also shows top cap 603 which mounts into the upper portion of main housing 301. Top cap 603 includes power switch 605. Power switch 605 can be a on-off switch or can be configured to cause lamp head 107 to emit multiple levels of illumination, for example, dim, medium and bright. Switch 605 can also be configured to turn on illuminating elements in the lamp head 107 in a desired sequence. Switch 605 can also be continuously variable, so that the light can be dimmed. The switch can be any type suitable for turning on one or more lights, for example a rotary switch, without departing form the scope of the invention.

Preferably, top cap 603 and base 313 along with main body 301 and battery compartment 303 form a watertight enclosure which protects the elements within the main body, particularly during transport. The elements within this watertight enclosure include the battery, electrical circuits and switches, cables supplying electrical power to the lamp head and telescoping poles to which adjust the height of the lamp head. Such a watertight enclosure also helps facilitate flotation of the collapsible light according to the invention, should it fall into a liquid.

Top cap 603 has opening 607 which accommodates one or more telescoping tubes. FIG. 6 shows a fixed tube 609 with cam lock 610 and a telescoping tube 611 which fits within fixed tube 609. The cam lock 610 can be used to set the height of telescoping tube 611 to any desired position within the range of the length of the tubes. More than one telescoping tube and cam lock can be used without departing from the scope and spirit of the invention. Electrical power to the lamp head is typically delivered through a coiled cable (not shown) which fits within the tubes and extends to a length appropriate to size and number of telescoping tubes.

Figure 7:
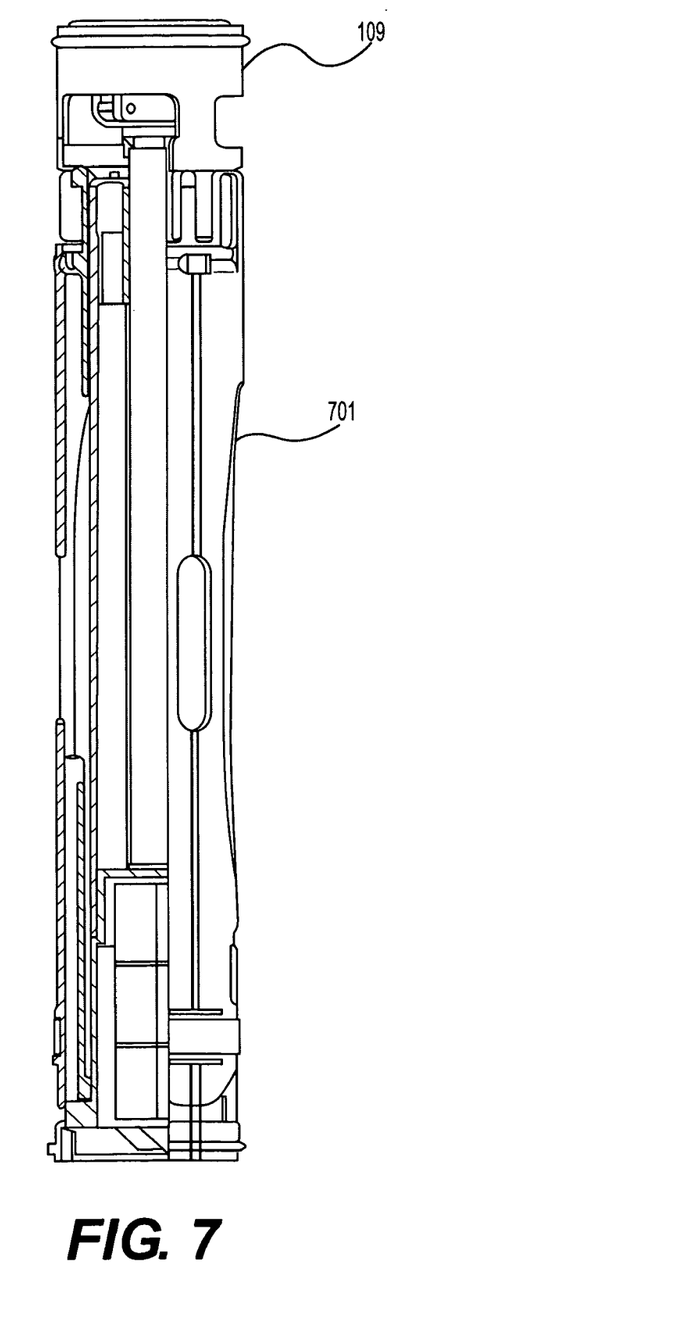
FIG. 7 shows a transparent view of a light according to the invention in the collapsed position to illustrate its internal configuration.

FIG. 7 is a transparent view of the portable light according to the invention, which illustrate the components of the portable light in the collapsed position for transport. FIG. 7 also illustrate an optional protective feature which can be provided by collar 109. As shown in FIG. 7, collar 109 and lamp head 107 are sized such that when the unit is collapsed and the telescoping members are retracted into each other, lamp head 107 fits within collar 109. Thus, when sized this way collar 109 protects lamp head 107 from damage during transport. As noted, however, this feature is optional and lamp head 107 can be of any desired size. FIG. 7 illustrates still another feature of a portable lamp according to the invention. As shown in FIG. 7, a portable light according to the invention can be scalloped in at least one area 701 to facilitate carrying the unit on one's back, for example using should strap 103 as previously disclosed herein.

Figure 8:
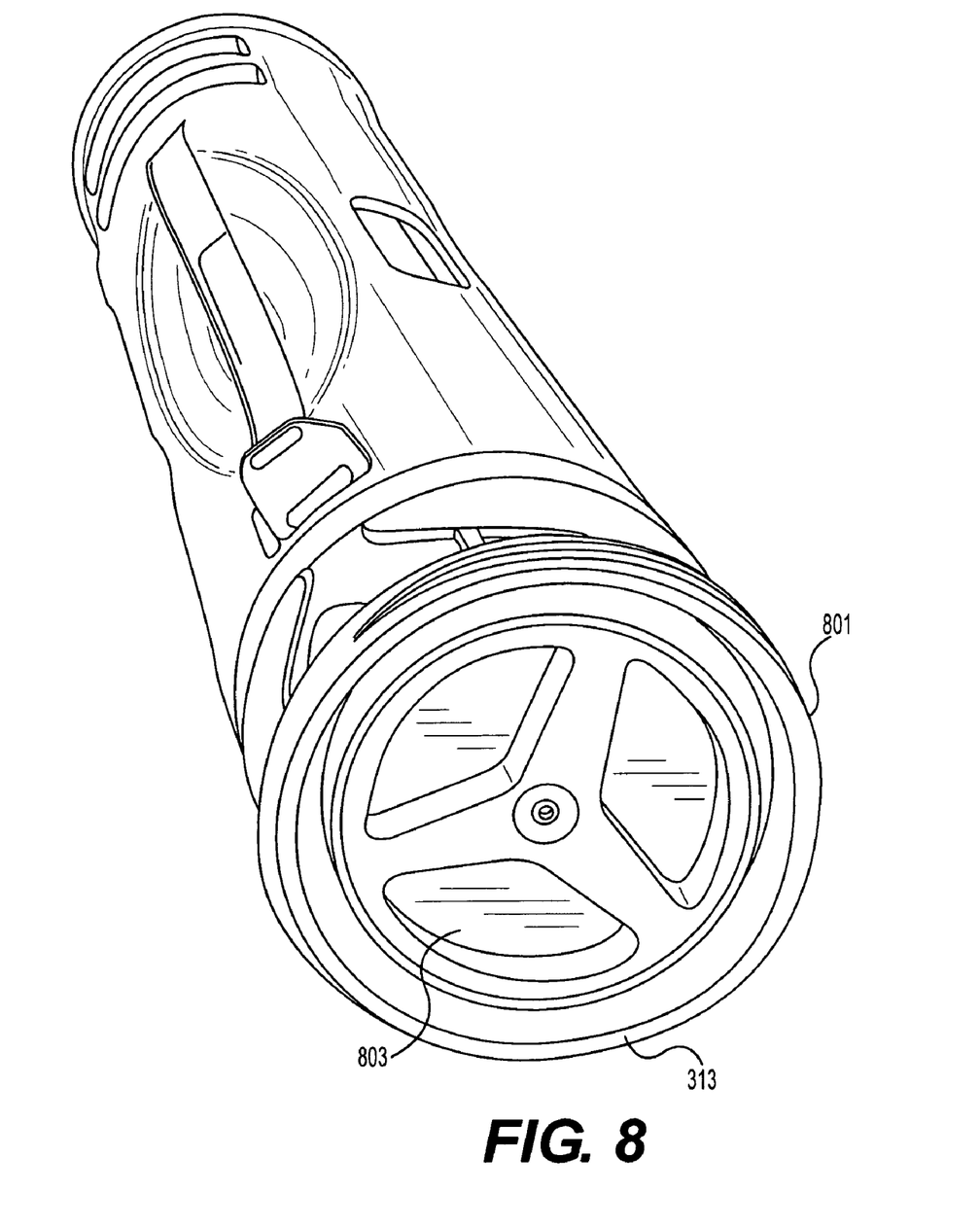
FIG. 8 shows a bottom perspective view of a light according to the invention in a collapsed position.

FIG. 8 illustrates a perspective view of a portable light according to the invention in a closed position. FIG. 8 illustrates base 313, which forms a battery compartment lid, with a rim 801 to protect the battery compartment 303. The battery compartment lid provides access to change the batteries which power the lamp head. Connections between the battery and the cable to the lamp head (not shown) are internal to the battery compartment. The battery compartment can also have a charging socket 803, as shown in FIG. 8. Charging circuitry is internal to the battery compartment and is not shown.

Figure 9:
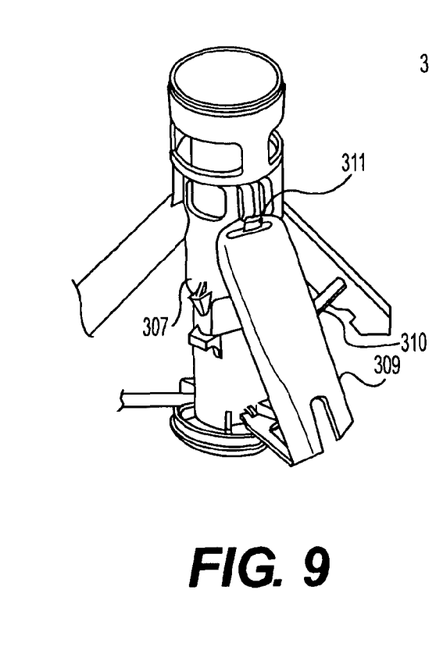
FIG. 9 shows the collar, base and legs of an assembly according to the invention.

FIG. 9 is a more detailed illustration of the pivot connection between lower collar portion 307 and legs 309. As noted previously, a metal prong can be used to bias the legs outward toward the deployed position. FIG. 9 shows another arrangement in which latch 901 is used to lock legs 309 into the deployed position.

Figure 10:
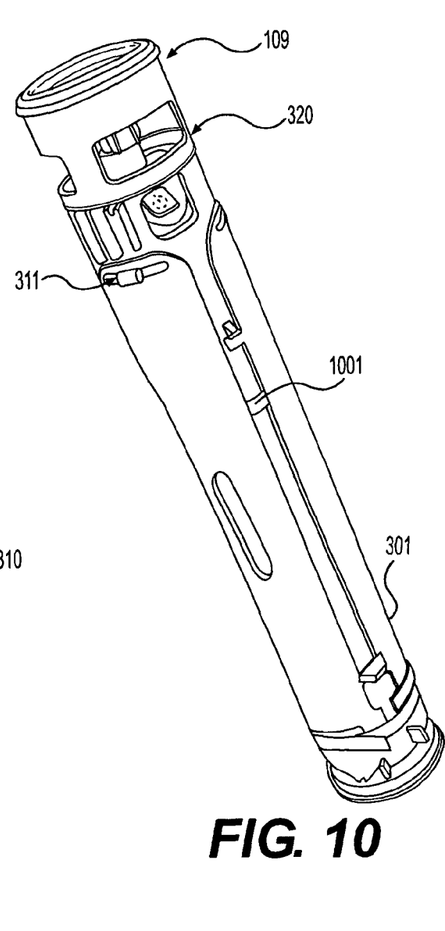
FIG. 10 is a side view of a light according to the invention in a collapsed position.

The side view in FIG. 10 illustrates another approach to locking in the closed position. In FIG. 10 latch 1001 is used to latch the collar 109 to the legs 309 to maintain the collapsed position. FIG. 10 also illustrates the cylindrical shape, resembling that of a bazooka, of the portable light 101 according to the invention when in the collapsed position.

Figure 11:
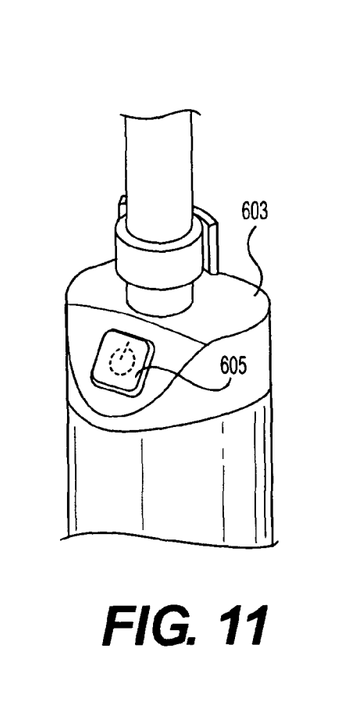
FIG. 11 illustrates the position of a multifunction power switch in a light according to the invention.

FIG. 11 is a more detailed illustration of switch 605 as located in main body top cap 603. Switch 605 can be equipped with a backlight, such as an LED, or other indicator to provide an indication of the current charge level.

Figure 12:
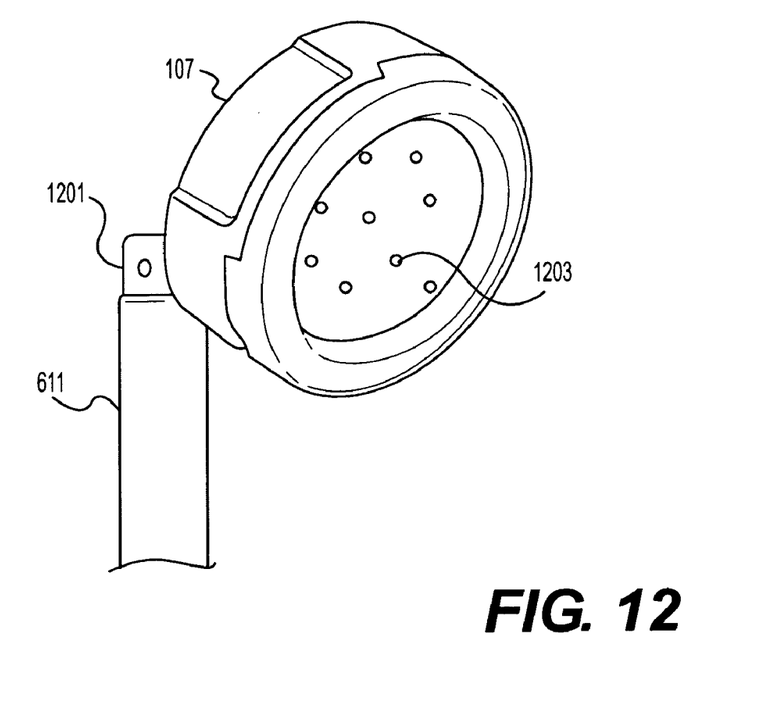
FIG. 12 illustrates a lamp head in a light according to the invention from a front perspective position.

FIG. 12 shows the lamp head 107 from the front, or illuminating side, as connected to an end of the telescoping pole 611. As illustrated in FIG. 12, lamp head 107 is connected to the telescoping pole using a connector 1201 which can pivot and/or rotate within the telescoping tube 611 to provide a wide range of motion. FIG. 12 also shows light emitting diodes 1203 in the lamp head, which illuminate to provide light. One or more other types of illuminating members could also be used. For example, the light emitting diodes could be replaced with or used in conjunction with halogen bulb, fluorescent bulb and/or incandescent bulbs. Any desired combination of such illuminating elements could be controlled by switch 605 to illuminate in any desired sequence, without departing from the scope of the invention.

Figure 13:
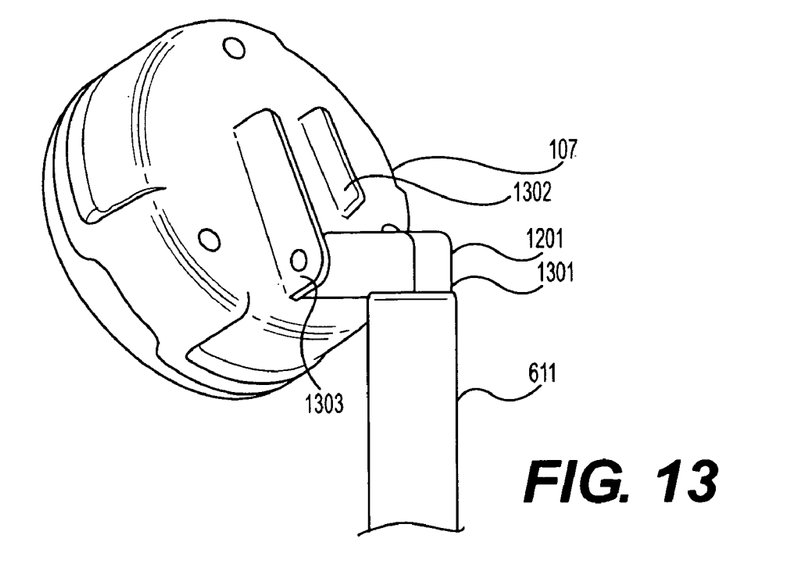
FIG. 13 illustrates a lamp head in a light according to the invention from a rear perspective position.

FIG. 13 shows lamp head 107 connected to telescoping tube 611 from the rear of the lamp head. As shown in FIG. 13, when pivoting connector 1201 is an offset hinge. Offset hinge 1202 includes a member 1301 which connects at a first end to the telescoping tube 611. Member 1301 can be arranged to rotate within tube 611, thereby allowing lamp head to be placed anywhere in a 360 range to direct light as desired. A second end of member 1301 pivotally connects to member 1302, which is connected to lamp head 107. By pivoting second member 1302 about point 1303, light from lamp head 107 can be directed vertically as desired. As shown, offset hinge 1201 permits about 135 degrees of movement of lamp head 107. Other arrangements which permit a wider or smaller range of motion may also be used. When the portable light according to the invention is to be placed in the collapsed position, lamp 107 is pulled toward the telescoping tube 611, such that member 1302 pivots about point 1303 to collapse member 1302 toward member 1301. When member 1302 is collapsed on member 1301, lamp 107 is positioned so that the illuminating elements therein face upward vertically. In this way, when the telescoping pole is lowered into the main body, the lamp head can be recessed into collar 109, so that collar 109 protects the lamp head. As illustrated in FIG. 12, when deployed, the connection between the lamp head and the main body provides a wide range of motion, allowing the lamp head to be rotated to direct the light in a preferred direction and to be pointed upward or downward at an angle limited only by the physical dimensions of the lamp head and the connector. It will also be recognized that more than one pivoting connector can be used to direct light in any desired direction.

Figure 14:
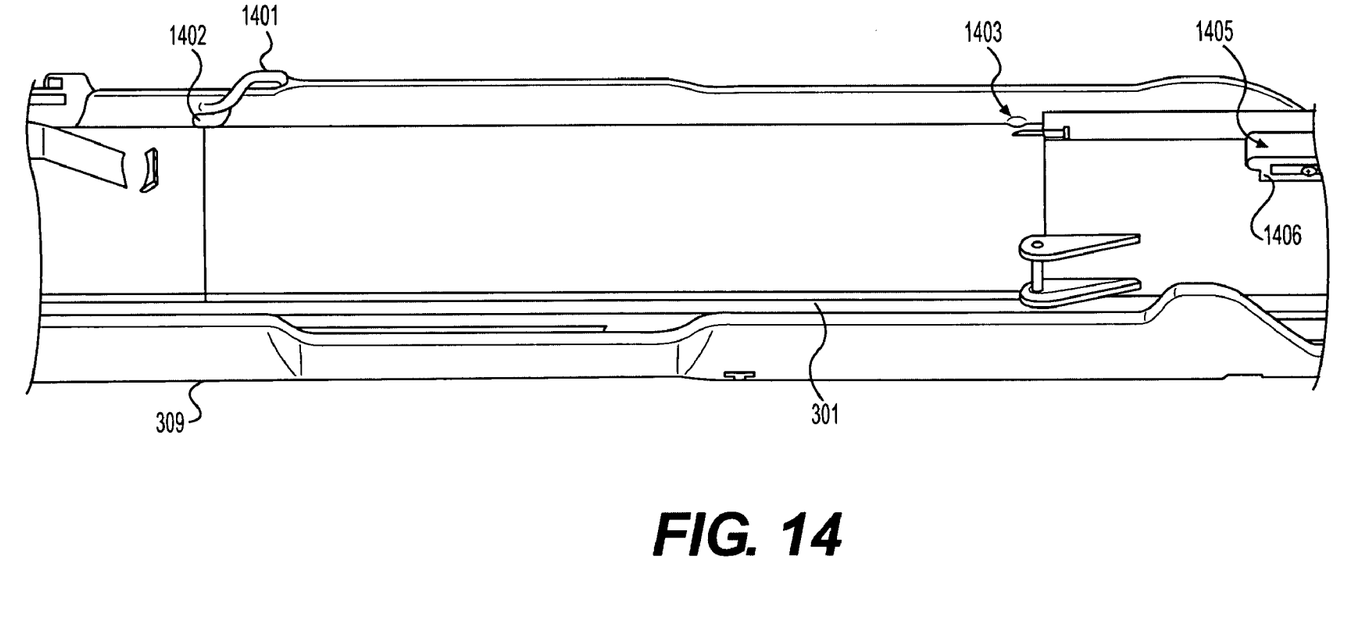
FIG. 14 illustrates a latching mechanism for use in a collapsible structure according to the invention.

FIG. 14 shows a detail of a latch mechanism that can be used in a collapsible structure according to the invention. FIG. 14 shows main body 301 and leg 309 in the collapsed position. To deploy, one lifts the flexible latch 1401 located on battery compartment 303. Leg 309 deploys outward from the main body 301 until member 1402 aligns with groove. Lifting latch 1401 to disengage member 1402 from groove 1403 allows the structure to return to the collapsed position. In this position, hoop 1405 on the inside of the leg engages with a corresponding fork 1406, thereby eliminating the need for a leg strap to hold the legs in collapsed position.

Figure 15:
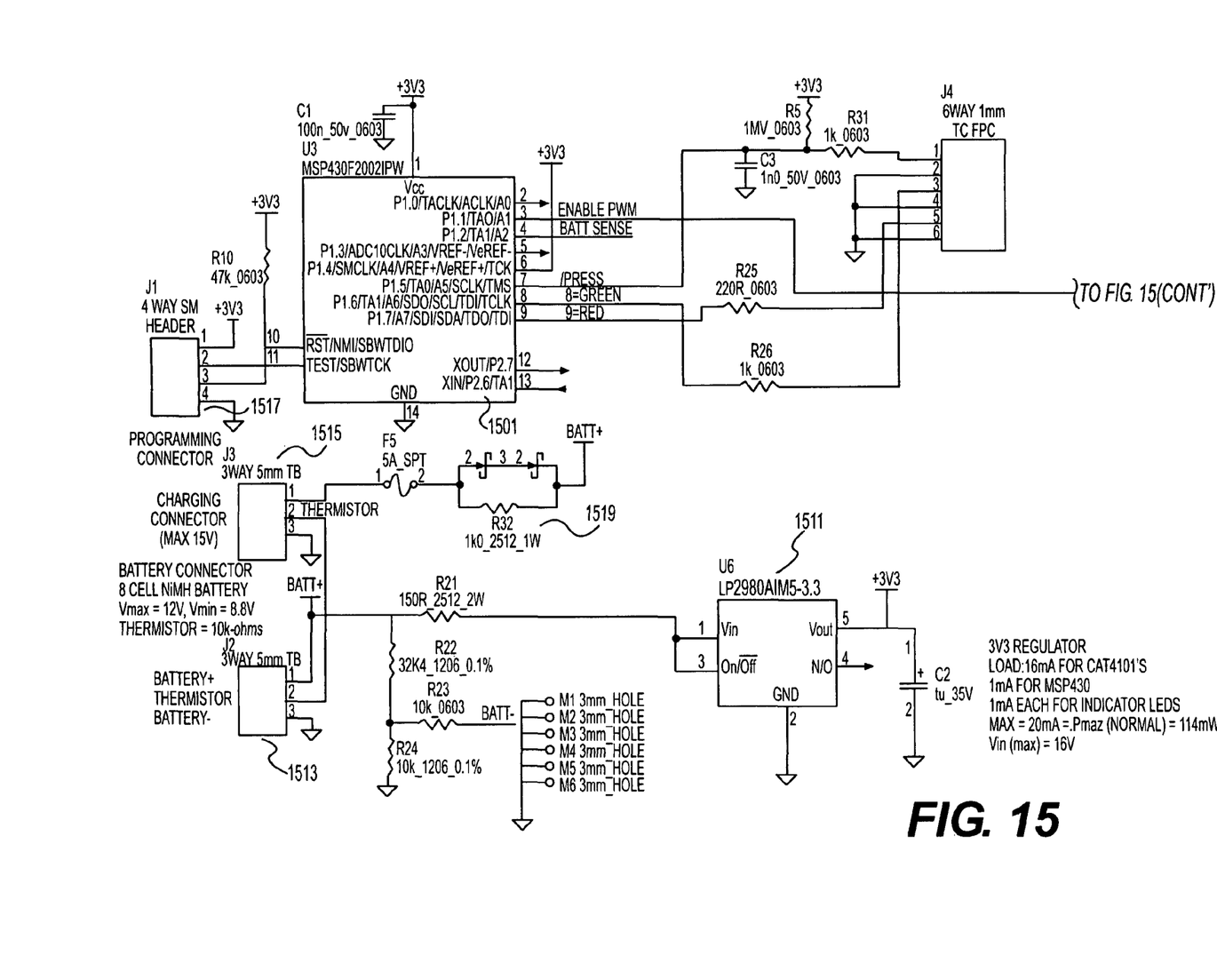
FIG. 15 is an electrical schematic of a collapsible light according to the invention.

FIG. 15 is an electrical schematic of a collapsible light according to the invention. Those of ordinary skill will recognize that the circuits implement the features previously discussed herein. Microcontroller 1501, such as MSP430F2002IPW, provides general control and operation to control LED drivers 1503, 1505, 1507 and 1509, for example, CAT 4101. These regulate the current to (drive) LEDs 1510 and 1512, 1514 and 1516. LEDS 1510, 1512, 1514 and 1516 receive power from fuse/resistor circuits 1502, 1504, 1506 and 1508. Voltage regulator 1511 provides voltage regulation from battery 1513. Battery 1513 may be recharged through charging connector 1515 and charging circuit 1519. Microcontroller 1501 is programmed to perform its functions through programming connector 1517.

The above description for a portable light is illustrative, as the structure of the invention may be used in conjunction with other devices. It will be recognized that the light may be replaced by other operational units performing other functions. For example, the light may be replaced by a speaker to broadcast sound, a device which provides heat, a fan, a sensor to measure contaminants or air quality or any other number of devices. Indeed, the device connected to the telescoping member need not be powered. For example, the light in the description above may be replaced by a reflector or a solar powered device which generates its own power. In the case of an device which does not require power, the battery compartment can remain empty. In still another application, the device connected to the end of the telescoping member may be one which generates electrical power, such as a windmill or solar collector. In that case, the battery compartment discussed above may be used to house energy storage devices.

What is claimed is:

1. A collapsible lighting device comprising:
   (a) a main body:
   (b) a telescoping member adjustable to a position within said main body;
   (c) a lamp head positioned at a first end of said telescoping member, said lamp head having sockets for illuminating elements;
   (d) an electrical connection to provide a connection between said lamp head and a power source; and
   (e) a collar surrounding said main body, said collar being adjustable to a first collar position relative to said main body when said lighting device is in a deployed position, and to a second collar position relative to said main body when said lighting device is in a collapsed position;
   wherein said collar is adjustable to a position to enclose exterior side surfaces of said lamp head when said lighting device is in said collapsed position.

2. The collapsible lighting device recited in claim 1, comprising:
   a leg pivotally connected to said collar and to said main body to support said lighting device in said deployed position.

3. The collapsible lighting device recited in claim 2, wherein said collar adjusts to said first collar position when said leg is in a first leg position to support said lighting device in said deployed position and said adjusts to said second collar position when said leg is in a second leg position.

4. The collapsible lighting device recited in claim 3, said collar having hand grips therein, said hand grips allowing adjustment of said collar to said first collar position and said second collar position.

5. The collapsible lighting device recited in claim 4, said collar having an opening wider than a diameter of said main body.

6. The collapsible lighting device recited in claim 5, comprising:
   a pivoting connection between said lamp head and said telescoping member.

7. The collapsible lighting device recited in claim 6, wherein said pivoting connection between said lamp head and said telescoping member comprises a hinge joint.

8. The collapsible lighting device recited in claim 7, said lamp head comprising a plurality of illuminating elements.

9. The collapsible lighting device recited in claim 8, said illuminating elements comprising at least one of a light emitting diode, an incandescent bulb, a fluorescent bulb, and a halogen bulb.

10. The collapsible lighting device recited in claim 9, said switch comprising an indicator to indicate a state of power available from said power source.

11. The collapsible lighting device recited in claim 9, comprising:
   a switch configured to activate at least one of said illuminating elements.

12. The collapsible lighting device recited in claim 11, wherein said switch activates each of said illuminating elements in a sequence.

13. The collapsible lighting device recited in claim 11, wherein said switch comprises a continuously variable switch.

14. The collapsible lighting device recited in claim 1, said power source comprising a battery.

15. The collapsible lighting device recited in claim 14, said battery comprising a rechargeable battery.

16. The collapsible lighting device recited in claim 14, comprising:
   battery recharging circuits.

17. The collapsible lighting device recited in claim 1, wherein said lighting device is configured to collapse to a substantially cylindrical shape.

18. The collapsible lighting device recited in claim 17, comprising:
   a shoulder strap for carrying said lighting device when in said collapsed position.

19. A lighting device comprising:
   (a) a main body;
   (b) a lamp head having sockets therein for illuminating elements;
   (c) an electrical connection to provide a connection between a power source and said lamp head;
   (d) a collar surrounding said main body, said collar being moveable relative to said main body; and
   (e) a plurality of legs adjustably connected to said collar such that a position of said legs determines a position of said collar, said legs configured to support said lighting device in an upright position;
   wherein said collar is adjustable to a position to enclose exterior side surfaces of said lamp head when said legs are in a collapsed position.

* * * * *